United States Patent Office 3,398,167

Patented Aug. 20, 1968

3,398,167

ACIDS AND SALTS IN WHICH THE ANION HAS A TRANSITION METAL ATTACHED TO ONE TO THREE —$S(CF_3)C{=}C(CF_3)S$— GROUPS

Walter Mahler, Wilmington, Del., assignor to E. I. du Pont de Nemours and Company, Wilmington, Del., a corporation of Delaware No Drawing. Filed Oct. 25, 1963, Ser. No. 318,790
20 Claims. (Cl. 260—429)

ABSTRACT OF THE DISCLOSURE

This disclosure describes and claims acids and salts having a monovalent or divalent mono-, bis- or tris [1,2 - bis(trifluoromethyl)ethene - 1,2 - dithiolato]metal anion, e.g., disilver bis[1,2-bis(trifluoromethyl)ethene-1, 2-dithiolato]nickelate and ammonium tris[1,2-bis(trifluoromethyl)ethene-1,2-dithiolato]molybdate, and their preparation by the reduction of corresponding neutral [1,2 - bis(trifluoromethyl)ethene - 1,2 - dithiolato]metal compounds. The claimed products can be used in developing fingerprints.

FIELD OF THE INVENTION

This invention is concerned with, and has as its principal objects provision of, a new class of ionic compounds, here acids and salts, having metal-organic anions and methods for the preparation of the same.

EMBODIMENTS OF THE INVENTION

The products of this invention are acids and salts having monovalent or divalent mono-, bis-, and tris[1,2-bis (trifluoromethyl)ethene-1,2-dithiolato]metal anions. They may be defined by Formula I:

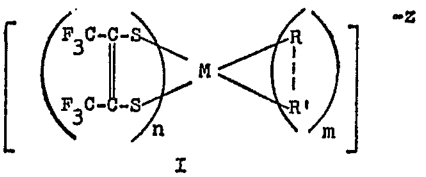

I where Q represents one equivalent of a cation, e.g., one equivalent of hydrogen, metal or ammonium, sulfonium, arsonium, phosphonium, stibonium, bismuthonium, selenonium, or telluronium cations in which any substituents, other than hydrogen, on the onium cations are alkyl or aryl of up to 20 carbon atoms. Metals are defined broadly as those elements of atomic number 3, 4, 11–13, 19–32, 37–51, 55–84, 87–103, and above. Preferably the onium cations may be represented, respectively, as $R^2_4N^+$, $R^3_3S^+$, $R^3_4As^+$, $R^3_4P^+$, $R^3_4Sb^+$, $R^3_4Bi^+$, $R^3_3Se^+$, and $R^3_3Te^+$, where each $R^2$ is hydrogen, alkyl or aryl or several $R^2$'s can be covalently joined together to form a heterocyclic aromatic ring with the nitrogen, e.g., methylpyridinium, methylquinolinium, dimethylphenanthrolinium, etc., and $R^3$ is alkyl or aryl. Thus, where three $R^2$'s of $R^2_4N^+$ are joined together, the structure is

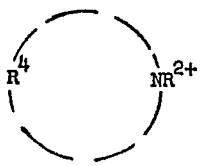

where $R^4$ is the carbocyclic portion of a hetero ring system and preferably contains up to a total of 18 carbon atoms. $R^2$ and $R^3$, described above, can contain up to 20 carbon atoms. Preferably $R^2$ is hydrogen, lower alkyl or phenyl and $R^3$ is lower alkyl or phenyl.

M is defined as a metal from Groups I–B, IV–B, V–B, VI–B, VII–B and VIII of the Periodic Table appearing in Deming's "General Chemistry," J. Wiley & Sons, Fifth Edition (1944), page 156, i.e., a transition metal of atomic number 22–29, 40–47, 72–79, all inclusive. Preferably M is nickel, molybdenum, vanadium, copper, cobalt, iron, chromium, or tungsten and most preferably nickel.

R and R′ represent certain uncharged groups that may be present in the anion and may be either separate or joined together as indicated by the broken line connecting them. When separate, R and R′ may be tertiary phosphine or tertiary amine; when joined, cyclopentadienyl or difunctional tertiary amine. Here tertiary phosphine groups include triloweralkylphosphine such as trimethylphosphine and tributylphosphine, triarylphosphine such as triphenylphosphine and diphenyl-p-tolyphosphine as well as mixed alkyl- and arylphosphines such as dimethylphenylphosphine, diamylphenylphosphine, and the like. Difunctional tertiary amine groups include those derived as by direct addition from such compounds as o-phenanthroline, dipyridyl and tetramethylethylenediamine.

*z*, the valence of the novel anion and hence also the number of equivalents of cation present, is 1 or 2. *m*, the number of uncharged groups present, is either 1 or 0. When *m* is 1, *n* is also 1. When *m* is 0 and M is one of the metals V, Cr, Mn, Fe, Co, Nb, Mo, Tc, Ru, Rh, Ta, W, Re, Os and Ir (metals of Periodic Groups V–B, VI–B, and VII–B and most of those of VIII), *n* is 3. When *m* is 0 and M is one of the metals Ti, Ni, Cu, Zr, Pd, Ag, Hf, Pt and Au (metals of Periodic Groups I–B, and IV–B and the rest of those of VIII), *n* is 2. In the compounds of this invention in which Q is hydrogen, a preferred sub-group is that in which *z* is 2.

The anions of this invention are prepared by reduction of the corresponding neutral mono-, bis-, and tris[1,2-bis(trifluoromethyl)ethene - 1,2 - dithiolato]metal compounds. Mild reduction produces a single electron change and results in a monovalent anion. Stronger reduction produces a double electron change and forms a divalent anion. Suitable reducing agents for preparing the monovalent anions include (a) polar solvents with dielectric constants greater than 12 such as water, acetonitrile, alcohols such as methanol, ethanol and butanol, acetone, and (b) ferrocene or a stoichiometric amount of an alkali metal, i.e., Li, Na, K, Rb, Cs, Fr, or an alkaline earth metal, i.e., Be, Mg, Ca, Sr, Ba, Ra, in an aromatic or saturated aliphatic or cycloaliphatic hydrocarbon solvent, or mixtures of these. Suitable reducing agents for producing the divalent anions include (a) the alkali metals and alkaline earth metals as defined above, in sufficient stoichiometric quantity (at least a slight excess) to insure formation of the divalent anion, and their alloys such as Na–Pb and Na–Hg employed in the presence of a liquid saturated aliphatic cycloaliphatic or aromatic hydrocarbon solvent or an ether solvent, and (b) electrochemical reductions in acetonitrile, alcohols such as methanol, ethanol and butanol, and ethers such as dimethyl ether, diethyl ether and tetrahydrofuran.

The reduction processes for preparing the monovalent and divalent anionic compounds of this invention from the corresponding neutral chelates may be carried out at temperatures in the range from −30° C. to 200° C. Pressure is not a critical factor in these processes and pressures both above and below atmospheric pressure are operable. Atmospheric pressure is preferred for convenience.

In these reduction processes intimate contact between the species to be reduced and the reducing agent is necessary. No added catalyst is required.

In the reduction of the neutral chelates to the monovalent anion species the liquid reducing agents serve as their own reaction media and no added solvent is required. Because the reducing agents are liquid, intimate contact suitable for carrying out the reduction is obtained by simple mixing of the reactants. Molar proportions of reducing agent to neutral species to be reduced may vary widely, for example in the range from 1000:1 to 1:19. The range from 1000:1 to 1:1 is preferred for best yields.

In the reduction of the monovalent anion species to the divalent anion species by alkali metal reduction, or by electrochemical reduction as described above, molar ratios of alkali metal to monovalent anion species in the range of 2:1 to 1:1 are preferred and in the electrochemical reduction the equimolar reaction of 1 Faraday of electricity per mole of monovalent anion is preferred.

The neutral mono-, bis-, and tris[1,2-bis(trifluoromethyl)ethene-1,2-dithiolato]metal chelate starting materials for the process of this invention are prepared either directly or indirectly from reactions involving bis(trifluoromethyl)dithiete. These starting materials may be represented by Formula II:

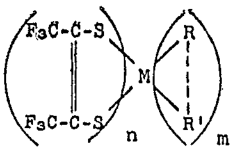

II in which M, R, R', *n*, and *m* are as defined above.

Compounds of Formula II in which *m* is 0 are prepared by the reaction of bis(trifluoromethyl)dithiete with the corresponding metal carbonyl or metal as indicated by the equation:

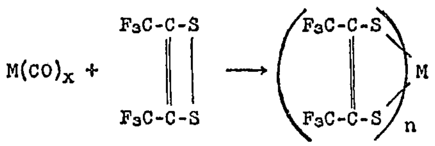

III IV in which M and *n* are as defined above and *x* is 0 to 6. Thus $M(CO)_x$ may be Ni, Mn, Cu, $Mo(CO)_6$, $Ni(CO)_4$, $W(CO)_6$, $Cr(CO)_6$, $Fe(CO)_5$, $[Co(CO)_4]_2$, $Ru(CO)_5$, $[Rh(CO)_4]_2$, $[Re(CO)_5]_2$, $Os(CO)_5$, $Ir(CO)_3$, $[Tc(CO)_5]_2$, and the like. This process is illustrated in Part A of Examples I, VI, and VIII.

Compounds of Formula II in which *m* is 0 are also prepared by treating the reaction product of bis(trifluoromethyl)dithiete and sodium metal with a heavy metal halide as indicated by the equation:

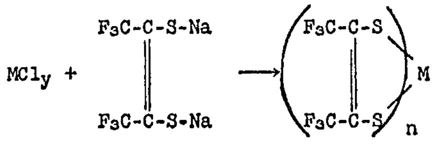

V IV in which M and *n* are as defined above and *y* is 1–5. Thus $MCl_y$ may be $TiCl_4$, $VCl_4$, $ZrCl_4$, $NbCl_5$, $PdCl_2$, $TaCl_5$, $PdCl_4$, $AuCl_3$, and the like. When this preparation is carried out in a polar solvent, the compound of Formula IV reacts with the solvent to be reduced to the corresponding compound of Formula I.

Compounds of Formula II in which *m* is 1 and R and R' taken together are a cyclopentadienyl group are prepared by the reaction of bis(trifluoromethyl)dithiete with a cyclopentadienyl metal carbonyl as illustrated by the equation:

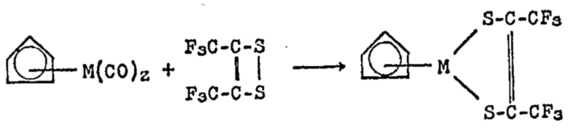

VI VII in which *z* is 1–4 and M is as defined above. In this reaction there may be employed cyclopentadienylvanadium tetracarbonyl, mercuric cyclopentadienylchromium tricarbonyl, cyclopentadienylmolybdenum tricarbonyl ether dimer, cyclopentadienylcobalt dicarbonyl, cyclopentadienylnickel carbonyl dimer, and the like.

Compounds of Formula II in which *m* is 1 and R and R' are tertiary phosphine groups or tertiary amine groups are prepared by the reaction of a compound of Formula IV with the corresponding phosphine or amine as indicated by the equation:

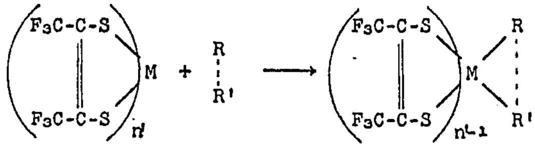

IV VIII IX in which *n'* is 2 or 3 and M, R and R' are as defined above. This process is illustrated in Part A of Examples XII and XIII.

In the following examples, Example VI represents a preferred embodiment. Parts are by weight unless otherwise indicated.

Example I.—Part A

To a solution of 630 parts of bis(trifluoromethyl) dithiete in 440 parts of benzene is added 240 parts of nickel carbonyl. The reaction mixture is allowed to stand a few minutes at room temperature. The precipitate which forms is separated by filtration and dried to obtain 350 parts of bis[1,2-bis(trifluoromethyl)ethene-1,2-dithiolato] nickel in the form of violet-black crystals melting at 135° C. and boiling at 240° C.

Part B

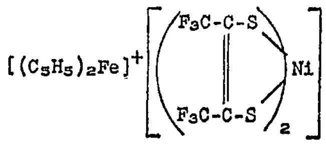

A solution of 93 parts of ferrocene in 3300 parts of hexane is mixed with a solution of 255 parts of bis[1,2-bis(trifluoromethyl)ethene-1,2-dithiolato]nickel in 3300 parts of hexane. After a few minutes at room temperature the brown powder which precipitates is separated by filtration and dried to obtain 348 parts of ferricinium bis[1,2-bis(trifluoromethyl)ethene-1,2-dithiolato]nickelate. The reaction is complete and neither of the reactants remains in the hexane filtrate. The visible absorption spectrum of a methanol solution of this salt shows a band at 6200 A. characteristic of ferricinium ion and bands at 8000, 5050 and 4150 A. characteristic of the bis[1,2-bis(trifluoromethyl)ethene-1,2-dithiolato]nickelate anion.

Example II

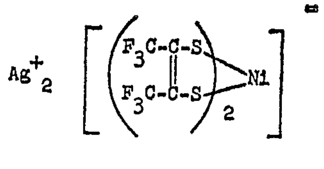

A solution of 659 parts of bis[1,2-bis(trifluoromethyl) ethene-1,2-dithiolato]nickel in 79,280 parts of methanol is mixed with a methanol solution containing a molecular excess of silver nitrate. For a few seconds the mixtures show a transient blue coloration and an orange precipitate forms rapidly. After about ten minutes the precipitate is collected by filtration and dried to obtain 519 parts of disilver bis[1,2-bis(trifluoromethyl)ethene - 1,2-dithiolato]nickelate in the form of a light brown powder. The explanation for the formation of the salt of the divalent anion instead of the monovalent anion is as follows:

When bis[1,2-bis(trifluoromethyl)ethene - 1,2-dithiolato]nickel dissolves in methanol (or another polar organic solvent) it oxidizes some of the solvent and is itself reduced to a monovalent anion so that a solution containing primarily hydrogen bis[1,2-bis(trifluoromethyl)ethene-1,2-dithiolato]nickelate is obtained. At least some of the solute disproportionates so that there is an equilibrium between the monovalent anion on the one hand and equal quantities of the dissolved neutral chelate and the divalent anion on the other hand. The silver salt of the divalent anion is much more insoluble than the corresponding monovalent anion salt. Accordingly, when the silver nitrate solution is added, the equilibrium is shifted by precipitation of disilver bis[1,2-bis(trifluoromethyl)ethene - 1,2-dithiolato]nickelate. The dissolved neutral chelate in turn reacts with more of the solvent to repeat the cycle and only the disilver salt is separated.

*Analysis.*—Calcd. for $Ag_2C_8F_{12}NiS_4$: Ag, 29.70; C, 13.22; F, 31.38; Ni, 8.08; S, 17.62. Found: Ag, 28.15; C, 13.65; F, 30.15; Ni, 8.09; S, 17.44.

Example III

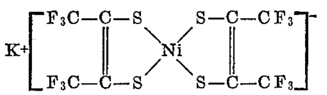

To a solution of 120 parts of bis[1,2-bis(trifluoromethyl)ethene-1,2-dithiolato]nickel in 15,856 parts of methanol is added a solution of 11 parts of potassium hydroxide in 1586 parts of methanol. The mixture is heated at 100° C. and evaporated to dryness under a stream of nitrogen. The resulting brown powder is extracted with 1290 parts of xylene. To the extract is added about 5440 parts of petroleum ether to precipitate 100 parts of the methanol solvate of potassium bis[1,2-bis(trifluoromethyl)ethene-1,2-dithiolato]nickelate in the form of a brown powder. A methanol solution of this product shows a characteristic absorption at 8000 A. and gives a paramagnetic signal when tested by EPR.

Example IV

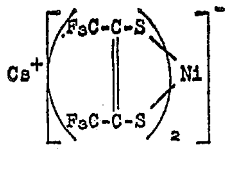

To a solution of 10 parts of potassium bis[1,2-bis(trifluoromethyl)ethene-1,2-dithiolato]nickelate in 100 parts of water is added a solution of 20 parts of cesium chloride in 50 parts of water. The brown powder which precipitates is separated by filtration and recrystallized from hot water to yield cesium bis[1,2-bis(trifluoromethyl)ethene-1,2-dithiolato]nickelate in the form of fine black needles, M.P. 150° C. In solution this product is paramagnetic and absorbs strongly at 8000 A.

*Analysis.*—Calcd. for $C_8CsF_{12}NiS_4$: C, 14.92; Cs, 20.66; F, 35.41; Ni, 9.12; S. 19.87. Found: C, 15.25; Cs, 20.1; F, 35.48; Ni, 9.17; S, 20.35.

Example V

To a solution of 10 parts of potasium bis[1,2-bis(trifluoromethyl)ethene-1,2-dithiolato]nickelate in 100 parts of water is added a solution of 10 parts of methyltriphenylphosphonium bromide in 20 parts of water. The brown precipitate which forms is separated by filtration and dissolved in about 22 parts of warm toluene. This solution is cooled to 0° C. for three hours and then filtered to recover 10 parts of methyltriphenylphosphonium bis[1,2-bis(trifluoromethyl)ethene - 1,2-dithiolato]nickelate in the form of black crystals, M.P. 145° C., which in methanol solution show an absorption at 8000 A.

Analysis.—Calcd. for $C_{27}H_{18}F_{12}NiPS_4$: C, 41.13; H, 2.29; F, 28.93; Ni, 7:45; P, 3.94; S, 16.25. Found: C, 41.23; H, 2.40; F, 29.72; Ni, 7.36; P, 4.35; S, 16.15.

Example VI.—Part A

A mixture of 790 parts of bis(trifluoromethyl)dithiete and 1360 parts of molybdenum hexacarbonyl in cyclohexane is heated at reflux for 50 hours. The dark reaction mixture is cooled and filtered to give 590 parts of a dark solid. The filtrate is evaporated to dryness to give 550 parts of a dark solid. By sublimation at 170° C./1 mm. there is obtained from the two solids products 224 parts and 188 parts respectively of tris[1,2-bis(trifluoromethyl) ethene-1,2-dithiolato]molybdenum.

Part B

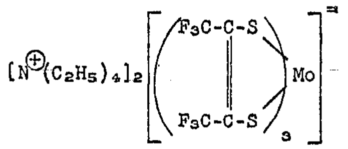

A sample of tris[1,2-bis(trifluoromethyl)ethene-1,2-dithiolato]molybdenum is dissolved in methanol. Potassium hydroxide is added, and the methanol then distilled by heating at about 100° C. under nitrogen. The blue residue that remains is dissolved in water. The resulting blue solution is filtered, and an aqueous solution of tetraethylammonium chloride is added. The resulting blue solid is recovered by filtration and recrystallized from 90:10 ethanol-acetonitrile to obtain bis(tetraethylammonium) tris [1,2-bis(trifluoromethyl)ethene - 1,2-dithiolato]molybdate in the form of short blue needles, M.P. 273–274° C. (dec.).

Analysis.—Calcd. for $C_{28}H_{40}F_{18}N_2S_6Mo$: C, 32.49; H, 3.90; N, 2.71. Found: C, 32.87; H, 3.98; N, 3.34, 3.53.

Example VII

In a glass reactor equipped with a stirrer and condenser and flushed with nitrogen is placed 1948 parts of cyclohexane, 340 parts of bis(trifluoromethyl)dithiete and 132 parts of molybdenum hexacarbonyl. Stirring and heating are begun while the reaction system is kept under nitrogen and the dark mixture is refluxed for 48 hours. The mixture is cooled and the solid product removed by filtration and washed with cyclohexane and petroleum ether to yield 129 parts of tris[1,2-bis(trifluoromethyl) ethene-1,2-dithiolato]molybdenum in the form of a brownred solid. The filtrate is concentrated to dryness in an evaporator. Excess bolybdenum hexacarbonyl is sublimed from the residue. The remaining solid is extracted with 1586 parts of methanol, and the mixture filtered to yield a green solution. A solution of 40 parts of potassium hydroxide in 793 parts of methanol is added and the resulting solution refluxed and then concentrated to dryness under nitrogen. The resulting solid is taken up in water, the solution filtered to free it from a small amount of oily material and 100 parts of tetraethylammonium chloride in 500 parts of water is added to the filtrate. A blue precipitate forms immediately. The product is recovered by filtration and dried to give 128 parts of blue powder. Recrystallization from an acetonitrile-ethanol mixture gives fine blue needles of bis(tetraethylammonium) tris [1,2-bis(trifluoromethyl)ethene - 1,2 - dithiolato]molybdate, M.P. (dec.) 273–274° C.

Example VIII.—Part A

A mixture of 340 parts of bis(trifluoromethyl)dithiete, 107 parts of chromium hexacarbonyl and 1368 parts of heptane is heated at reflux under nitrogen for four days. After cooling, there is obtained 250 parts of green crystalline solid. Unreacted chromium hexacarbonyl is removed by sublimation from this product by heating at 90° C. (1 mm.) for 24 hours. Recrystallization of the residue from methylcyclohexane gives dark green crystals of tris [1,2-bis(trifluoromethyl)ethene-1,2-dithiolato]chromium.

*Analysis*.—Calcd. for $C_{12}F_{18}S_6Cr$: C, 19.73; H, 0.00; S, 26.34. Found: C, 20.40; H, 0.32; S, 26.28.

Part B

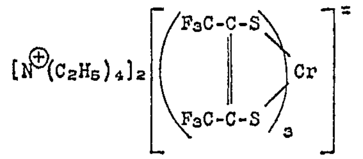

Tris[1,2-bis(trifluoromethyl)ethene - 1,2 - dithiolato] chromium (30 parts) is added to methanol and a solution of 20 parts of potassium hydroxide in methanol is added. The resulting green solution is evaporated to dryness. The solid residue is taken up in water and filtered to give a green solution containing dipotassium tris[1,2-bis(trifluoromethyl)ethene-1,2-dithiolato]chromate. A solution of tetraethylammonium chloride in water is added. The dark precipitate which forms is separated by filtration and dried. It is recrystallized from 90/10 ethanol/acetonitrile to obtain bis(tetraethylammonium) tris[1,2-bis(trifluoromethyl)ethene - 1,2 - dithiolato]chromate, M.P. (dec.) 190–195° C.

*Analysis*.—Calcd. for $C_{28}H_{40}F_{18}N_2S_6Cr$: C, 33.93; H, 4.07; N, 2.83. Found: C, 34.43; H, 4.31; N, 3.29.

Example IX

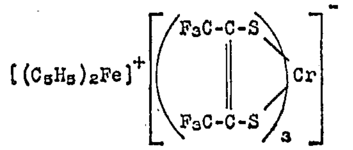

A solution of tris[1,2-bis(trifluoromethyl)ethene-1,2-dithiolato]chromium in cyclohexane is added to a solution of ferrocene in cyclohexane to give a dark solid precipitate. This product is recovered by filtration and dried to obtain ferricinium tris[1,2-bis(trifluoromethyl) ethene-1,2-dithiolato]chromate.

*Analysis*.—Calcd. for $C_{22}H_{10}F_{18}S_6CrFe$: C, 28.83; H, 1.10; S, 20.99. Found: C, 28.50; H, 1.28; S, 21.17.

Example X

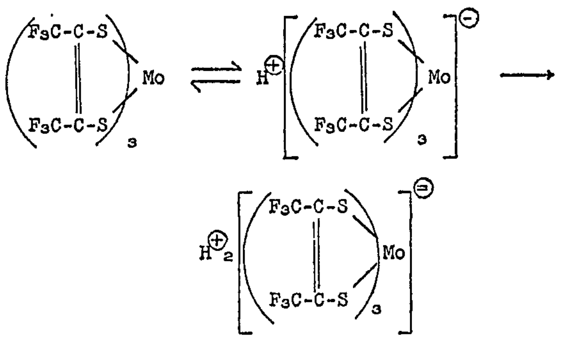

In a glass reactor is placed 13.23 parts of tris[1,2-bis (trifluoromethyl)ethene - 1,2 - dithiolato]molybdenum and 66,538 parts of deoxygenated acetonitrile containing 905 parts of lithium perchlorate. Most of the tris[1,2-bis (trifluoromethyl)ethene-1,2 - dithiolato]molybdenum dissolves in the acetonitrile solution. By reaction with acetonitrile approximately two thirds of the dissolved material is converted to the free acid of its monoanion, i.e., hydrogen tris[1,2-bis(trifluoromethyl)ethene - 1,2 - dithiolato]molybdate. By means of a polarograph an E.M.F. is applied to this solution between a rotating platinum electrode and an aqueous saturated calomel electrode. As the voltage on the platinum anode is increased, the monovalent anion species is reduced to the divalent anion species at a half-wave potential of +0.22 volt. This reduction represents the conversion of hydrogen tris[1,2-bis(trifluoromethyl)ethene - 1,2-dithiolato]molybdate to dihydrogen tris[1,2 - bis(trifluoromethyl)ethene - 1,2-dithiolato]molybdate.

Example XI

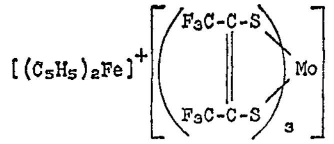

To a solution of 390 parts of tris[1,2-bis(trifluoromethyl)ethene-1,2-dithiolato]molybdenum in 17,590 parts of benzene is added 93 parts of ferrocene in 1759 parts of benzene. The solution is warmed on a steam bath and stirred for one hour. The precipitate which forms is recovered by cooling and filtration to give fine, dark crystals of ferricinium tris[1,2-bis(trifluoromethyl)ethene-1,2-dithiolato]molybdate.

*Analysis*.—Calcd. for $C_{22}H_{10}F_{18}S_6MoFe$: C, 27.51; H, 1.05; S, 20.02. Found: C, 27.51; H, 1.19; S, 20.19.

Example XII.—Part A

To a solution of 27 parts of bis[1,2-bis(trifluoromethyl) ethene-1,2-dithiolato]nickel in 430 parts of xylene is added a solution of 25 parts of triphenylphosphine in 430 parts of xylene. After 16 hours at 25° C. the yellow crystals which form are separated by filtration and dried to obtain 12 parts of [1,2-bis(trifluoromethyl)ethene-1,2-dithiolato] bis(triphenylphosphine)nickel in the form of yellow crystals.

*Analysis*.—Calcd. for $C_{40}H_{30}F_6NiP_2S_2$: C, 59.38; H, 3.71; F, 14.10; Ni, 7.26; P, 7.67; S, 7.92. Found: C, 60.20; H, 4.05; F, 13.94; Ni, 6.97; P, 7.40; S, 7.47.

Part B

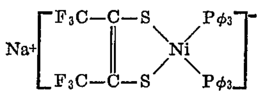

One equivalent of [1,2-bis(trifluoromethyl)ethene-1,2-dithiolato]bis(triphenylphosphine)nickel is treated with one equivalent of sodium metal in dimethoxyethane to obtain sodium [1,2-bis(trifluoromethyl)ethene - 1,2 - dithiolato]bis(triphenylphosphine)nickelate.

Example XIII.—Part A

To a solution of 200 parts of bis[1,2-bis(trifluoromethyl)ethene-1,2-dithiolato]nickel in about 10,200 parts of petroleum ether is added a solution of 77 parts of o-phenanthroline in about 2200 parts of warm benzene. The red precipitate which forms is separated by filtration and dried to obtain 200 parts of [1,2-bis(trifluoromethyl)ethene-1,2-dithiolato]phenanthrolinenickel.

*Analysis*.—Calcd. for $C_{16}H_8F_6N_2NiS_2$: C, 41.30; H, 1.72; F, 24.52; N, 6.02; Ni, 12.63; S, 13.77. Found: C, 40.31; H, 1.74; F, 24.77; N, 5.97; Ni, 11.87; S, 13.59.

Part B

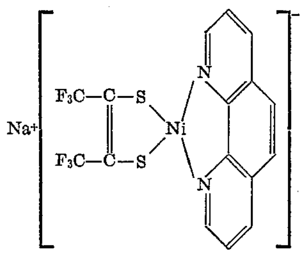

One equivalent of [1,2-bis(trifluoromethyl)ethene-1,2-dithiolato]phenanthrolinenickel is treated with one equivalent of sodium in dimethoxyethane to obtain sodium [1,2 - bis(trifluoromethyl)ethene - 1,2 - dithiolato]phenanthrolinenickelate.

When the neutral chelates indicated in column 1 of Table I are dissolved in an organic polar solvent, such as methanol, ethanol, acetontrile, acetone and the like, the chelate rapidly oxidizes some of the solvent and is itself reduced to a monovalent anion so that there is obtained a solution of the free acid indicated in column 2. A portion of the solution of the free acid is further reduced electrolytically by passing one faraday of electricity per mole of acid through the solution between platinum electrodes to obtain the corresponding divalent anion in the form of a solution of the free acid indicated in column 3. The acid solutions are readily treated with metal oxides and hydroxides such as an oxide or hydroxide of $Li^+$, $Na^+$, $Mg^{++}$, $K^+$, $Ca^{++}$, $Cr^{+++}$, $Mn^{++}$, $Fe^{++}$, $Fe^{+++}$, $Co^{++}$, $Co^{+++}$, $Ni^{++}$, $Cu^{++}$, $Zn^{++}$, $Rb^+$, $Sr^{++}$, $Mo^{+++}$, $Ag^+$, $Cd^{++}$, $Sn^{++}$, $Cs^+$, or $Ba^{++}$, to obtain the corresponding metal salts which are isolated by precipitation and filtration or by evaporation of solvent. The acid solutions are also readily treated with onium halides such as $(CH_3)_4NCl$, $(CH_3)_3SCl$, $(CH_3)(C_6H_5)_3ASCl$, $(CH_3)(C_6H_5)_3PCl$, $(CH_3CH_2)(C_6H_5)_3SbCl$, $(CH_3)(C_6H_5)_3BiCl$, $(CH_3CH_2)_3SeCl$, and $(CH_3)_3TeCl$ to obtain the corresponding onium salts in which the respective monovalent or divalent [bis-1,2-(trifluoromethyl)ethene - 1,2 - dithiolato]metal anion replaces the halide.

TABLE I

| Neutral Chelate | Acid Formed on Dissolution of Neutral Chelate in Methanol | Acid Formed on Electrolysis of Acid Solution in Column 2 |
|---|---|---|
| 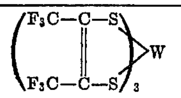 | 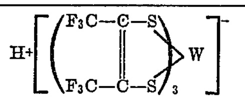 | 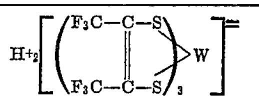 |
| 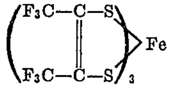 | 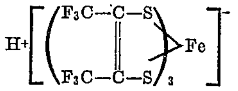 | 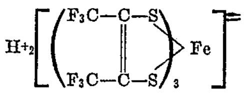 |
| 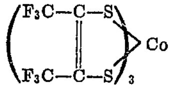 | 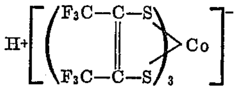 | 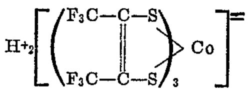 |
| 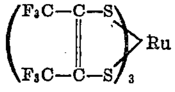 | 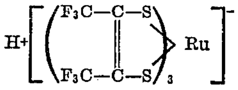 | 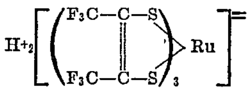 |
| 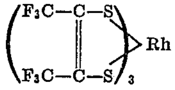 | 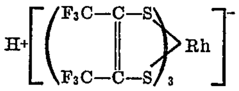 | 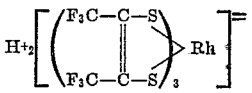 |
| 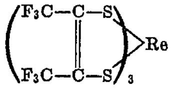 | 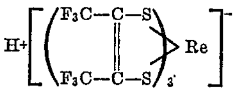 | 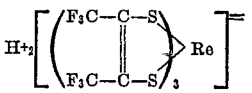 |
| 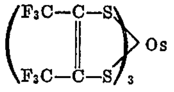 | 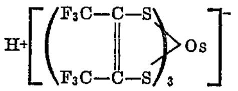 | 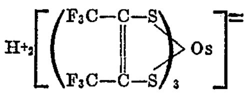 |
| 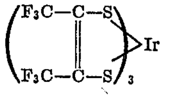 | 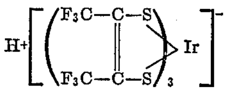 | 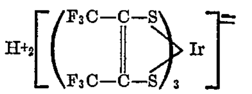 |
| 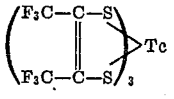 | 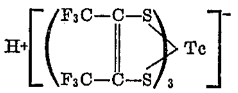 | 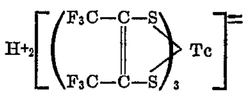 |
| 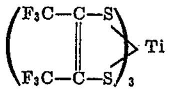 | 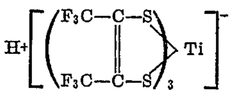 | 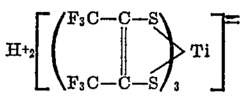 |
| 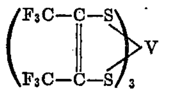 | 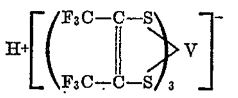 | 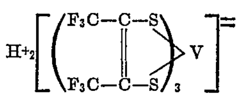 |
| 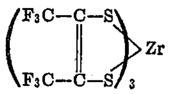 | 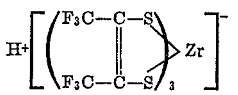 | 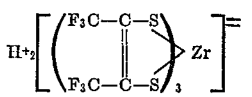 |
| 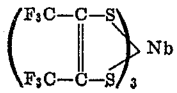 | 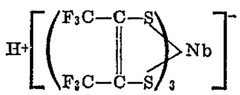 | 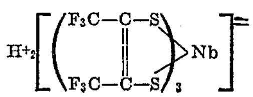 |

TABLE I—Continued

| Neutral Chelate | Acid Formed on Dissolution of Neutral Chelate in Methanol | Acid Formed on Electrolysis of Acid Solution in Column 2 |
|---|---|---|
| 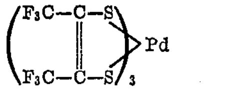 | 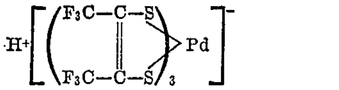 | 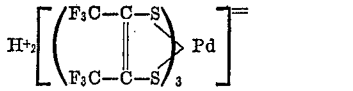 |
| 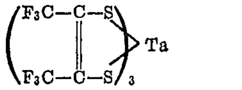 | 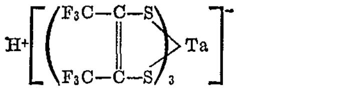 | 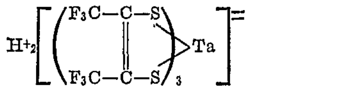 |
| 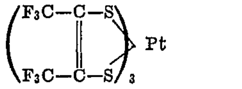 | 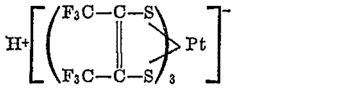 | 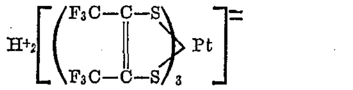 |
| 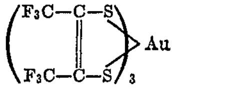 | 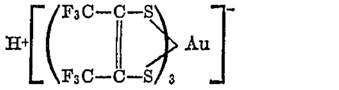 | 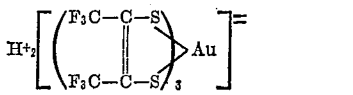 |
| 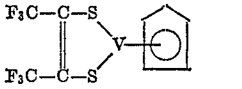 | 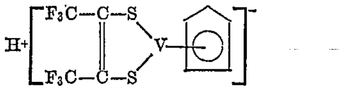 | 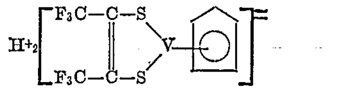 |
| 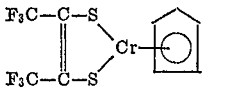 | 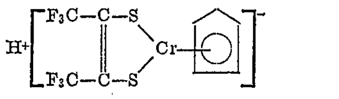 | 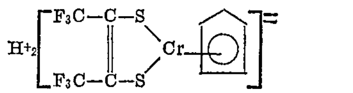 |
| 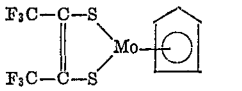 | 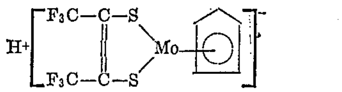 | 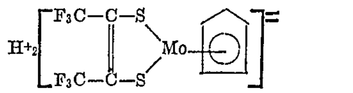 |
| 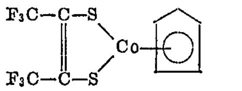 | 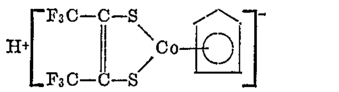 | 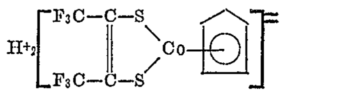 |
| 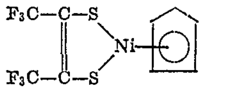 | 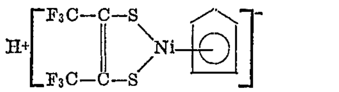 | 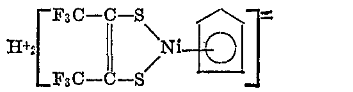 |
| 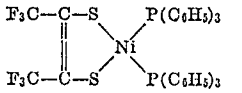 | 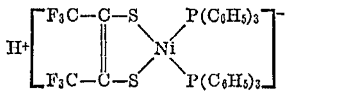 | 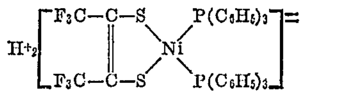 |
| 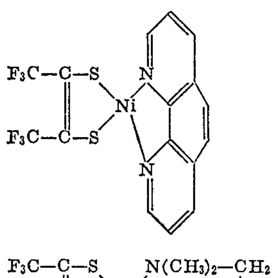 | 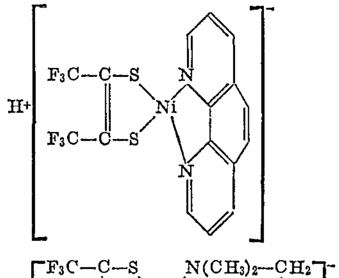 | 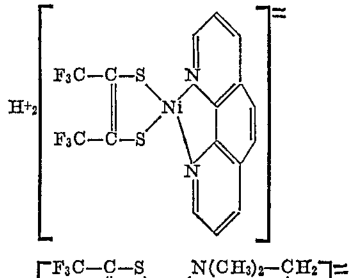 |
| 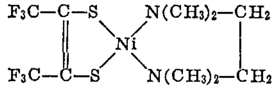 | 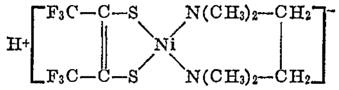 | 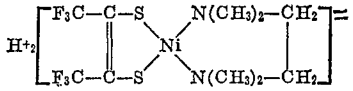 |

Single crystals of the compounds of Formula I have low electrical volume resistivity in the range from $10^{13}$ to $10^5$ ohm-cm. Hence they are useful in electrical devices for their electrical conducting properties.

The acids and salts of Formula I in finely divided form are useful in criminal investigations since they react selectively with the imprinted area of fingerprints, turning the imprinted area very dark in color and thereby developing the fingerprint.

Example XIV

A thumb is pressed to a piece of plain white paper. The paper is then dusted with powdered ferricinium tris[1,2-bis(trifluoromethyl)ethene-1,2 - dithiolato]chromate. The powder is shaken off the paper but it remains on the fingerprint, exposing it clearly. In similar manner, fingerprints are developed using disilver bis[1,2-bis(trifluoromethyl)-ethene-1,2-dithiolato]nickelate and tetraethylammonium tris[1,2-bis(trifluoromethyl)ethene-1,2 - dithiolato]molybdate.

Since obvious modifications and equivalents will be evident to those skilled in the chemical arts, I propose to be bound solely by the appended claims.

The embodiments of the invention in which an exclusive property or privilege is claimed are defined as follows:

1. An ionic compound having an anion the valence of which is an integer from 1 to 2 and the formula of which is

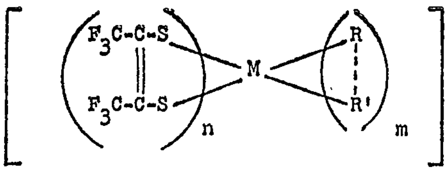

wherein:

M is a metal selected from those of Groups I–B, IV–B, V–B, VI–B, VII–B and VIII of the Periodic Table;

R and R′ are selected from the group consisting, (1) individually, of monofunctional tertiary phosphine and amine, and (2) jointly, of cyclopentadienyl and difunctional tertiary amine; and

*m* is a number from 0 to 1; and

*n* is a number from 1 to 3, being 1 when *m* is 1, being 2 when *m* is 0 and M is selected from the group consisting of Ti, Ni, Cu, Zr, Pd, Ag, Hf, Pt and Au, and being 3 when *m* is 0 and M is selected from the group consisting of V, Cr, Mn, Fe, Co, Nb, Mo, Tc, Ru, Rh, Ta, W, Re, Os, and Ir.

2. An ionic compound having the bis[1,2-bis(trifluoromethyl)ethene-1,2-dithiolato]nickelate anion, the valence of said anion being an integer from 1 to 2.

3. Ferricinium bis[1,2-bis(trifluoromethyl)ethene-1,2-dithiolato]nickelate.

4. Disilver bis[1,2 - bis(trifluoromethyl)ethene - 1,2-dithiolato]nickelate.

5. An alkali metal bis[1,2-bis(trifluoromethyl)ethene-1,2-dithiolato]nickelate.

6. A phosphonium bis[1,2-bis(trifluoromethyl)ethene-1,2-dithiolato]nickelate.

7. An ionic compound having the tris[1,2-bis(trifluoromethyl)ethene-1,2-dithiolato]molybdate anion, the valence of said anion being an integer from 1 to 2.

8. An ammonium tris[1,2-bis(trifluoromethyl)ethene-1,2-dithiolato]molybdate.

9. A hydrogen tris[1,2-bis(trifluoromethyl)ethene-1,2-dithiolato]molybdate.

10. An ionic compound having the tris[1,2-bis(trifluoromethyl)ethene-1,2-dithiolato]chromate anion, the valence of said anion being an integer from 1 to 2.

11. An ammonium tris[1,2-bis(trifluoromethyl)ethene-1,2-dithiolato]chromate.

12. The process of producing an anion which comprises reducing a neutral compound of the formula

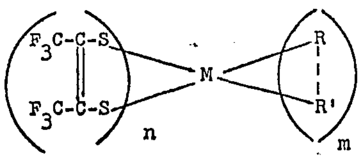

wherein:

M is a metal selected from those of Groups I–B, IV–B, V–B, VI–B, VII–B and VIII of the Periodic Table;

R and R′ are selected from the group consisting, (1) individually, of monofunctional tertiary phosphine and amine and, (2) jointly, of cyclopentadienyl and difunctional tertiary amine;

*m* is a number from 0 to 1; and

*n* is a number from 1 to 3, being 1 when *m* is 1, being 2 when *m* is 0 and M is selected from the group consisting of Ti, Ni, Cu, Zr, Pd, Ag, Hf, Pt and Au, and being 3 when *m* is 0 and M is selected from the group consisting of V, Cr, Mn, Fe, Co, Nb, Mo, Tc, Ru, Rh, Ta, W, Re, Os and Ir.

13. The process of claim 12 accomplished by contacting the neutral compound with a liquid polar reducing agent having a dielectric constant greater than 12.

14. The process of claim 12 accomplished by contacting the neutral compound with a member of the group consisting of ferrocene and alkali and alkaline earth metals.

15. The process of claim 12 accomplished by electrolysis.

16. The process which comprises contacting ferrocene with bis[1,2 - bis(trifluoromethyl)ethene - 1,2 - dithiolato] nickel, and thereby reducing the latter.

17. The process which comprises contacting a methanol solution of a member of the group consisting of salts and bases with bis[1,2 - bis(trifluoromethyl)ethene - 1,2-dithiolato]nickel, and thereby reducing the latter.

18. The process which comprises contacting an aqueous solution of a member of the group consisting of salts and bases with bis[1,2 - bis(trifluoromethyl)ethene - 1,2-dithiolato]nickel, and thereby reducing the latter.

19. The process which comprises contacting an aqueous solution of a member of the group consisting of salts and bases with tris[1,2 - bis(trifluoromethyl)ethene - 1,2-dithiolato]molybdenum, and thereby reducing the latter.

20. The process which comprises electrolytically reducing a solution of tris[1,2-bis(trifluoromethyl)ethene-1,2-dithiolato]molybdenum in a polar solvent to form a divalent anion.

References Cited

UNITED STATES PATENTS

| | | | |
|---|---|---|---|
| 3,097,225 | 7/1963 | Dubeck | 260—429 |
| 3,255,195 | 7/1966 | Benson | 260—270 |
| 2,489,523 | 11/1949 | Clifton | 204—72 |

OTHER REFERENCES

Bahr et al., (I) Chem. Ber., 90 (1957) pp. 438–443.

Bahr, (II) Ang. Chem., vol. 70, (1958) pp. 606–7.

Simmons et al., J. Am. Chem. Soc., vol. 84, (1962) pp. 4782–4784.

TOBIAS E. LEVOW, *Primary Examiner.*

A. P. DEMERS, *Assistant Examiner.*

UNITED STATES PATENT OFFICE
CERTIFICATE OF CORRECTION

Patent No. 3,398,167 August 20, 1968

Walter Mahler

It is certified that error appears in the above identified patent and that said Letters Patent are hereby corrected as shown below:

Column 1, lines 35 to 45, before the opening bracket of the formula, insert -- $Q_z^+$ --. Column 4, line 13, cancel "ether". Column 6, line 20, "solids" should read -- solid --; line 60, "bolybdenum" should read -- molybdenum --. Column 10, line 16, "ASCl," should read -- AsCl, --.

Signed and sealed this 3rd day of February 1970.

(SEAL)
Attest:

Edward M. Fletcher, Jr.
Attesting Officer

WILLIAM E. SCHUYLER, JR.
Commissioner of Patents